United States Patent [19]
Abbott

[11] Patent Number: 5,412,304
[45] Date of Patent: May 2, 1995

[54] COOLED PRIMARY OF AUTOMOBILE BATTERY CHARGING TRANSFORMER

[75] Inventor: Russell M. Abbott, Riverside, Calif.

[73] Assignee: Hughes Aircraft Company, Los Angeles, Calif.

[21] Appl. No.: 103,618

[22] Filed: Aug. 9, 1993

[51] Int. Cl.⁶ .............................................. H02J 7/00
[52] U.S. Cl. ............................................ 320/2; 336/60
[58] Field of Search ................. 320/2; 336/60, 61, 62, 336/DIG. 2

[56] References Cited

U.S. PATENT DOCUMENTS

| | | | |
|---|---|---|---|
| 3,579,162 | 5/1971 | Savkar | 336/60 X |
| 3,602,631 | 8/1971 | Sheppard | 336/94 X |
| 3,743,867 | 12/1971 | Smith, Jr. | 310/52 |
| 4,031,449 | 6/1977 | Trombly | 320/2 |
| 4,347,472 | 8/1982 | Lemelson | 320/2 |
| 4,447,796 | 5/1984 | Heinrichs | 336/60 |
| 4,496,896 | 1/1985 | Melocik et al. | 320/2 |
| 4,577,175 | 3/1986 | Burgher et al. | 336/61 |
| 4,800,328 | 1/1989 | Bolger et al. | 320/2 |
| 4,829,223 | 5/1989 | Broberg et al. | 320/2 |
| 5,049,802 | 9/1991 | Mintus et al. | 320/2 |
| 5,070,293 | 12/1991 | Ishii et al. | 320/2 |
| 5,157,319 | 10/1992 | Klontz et al. | 320/2 |
| 5,202,617 | 4/1993 | Nor | 320/2 |
| 5,327,065 | 7/1994 | Bruni et al. | 320/2 |

*Primary Examiner*—Kristine L. Peckman
*Attorney, Agent, or Firm*—L. A. Alkov; W. K. Denson-Low

[57] ABSTRACT

The primary winding and part of the magnetic circuit of an automobile battery charging transformer are mounted in a separable inductive charge coupler which is insertable into and removable from an inductive charge receptacle slot in the automobile adjacent the transformer secondary winding and magnetic structure. When the inductive charge coupler is in place and is energized, the primary winding energizes the secondary winding to permit charging of the batteries on the automobile. The inductive charge coupler is cooled by a fluid passage therein. The coolant may be a gas which is vented or may be a liquid which is circulated.

31 Claims, 3 Drawing Sheets

COOLED PRIMARY OF AUTOMOBILE BATTERY CHARGING TRANSFORMER

FIELD OF THE INVENTION

In charging the batteries of automobiles, a transformer primary inductive charge coupler is inserted into the transformer secondary inductive charge receptacle on the automobile, which thence charges the batteries of the automobile. The primary inductive charge coupler is cooled to cool the transformer for increased performance and so that the transformer coupler is not too hot when removed.

BACKGROUND OF THE INVENTION

In order to reduce air pollution, there is a modern trend toward electrically powered automobiles. These electrically powered automobiles have rechargeable batteries therein. The power of the batteries is used to propel the automobile and to provide for other power needs thereof. The design of such a vehicle is a careful balance between payload, performance, range between charging, acceleration, and speed. No matter what the combination of these criteria, there is need to recharge the batteries periodically so that the automobile may be taken on another excursion. With fairly large battery capacity, there is need to recharge a substantial amount of power. Since the time when an automobile is unavailable should be minimized, high charging rates are desirable. If an ordinary plug is to be used, the plug must be suited for high power, which brings about a risk of harm to the operator and/or other people in the vicinity from contact with parts of the electrical supply system.

It is, thus, desirable to make a coupling between the charging station and the automobile which does not require the direct transfer of electricity. A magnetic coupling is desirable. In accordance with this invention, an inductive charge coupler can be manually handled and inserted in an appropriate inductive charge receptacle slot in the automobile. The inductive charge coupler is a transformer primary and contains an appropriate magnetic conductor. The inductive charge receptacle slot contains the secondary winding(s) together with the rest of the magnetic core. The transformer secondary in the automobile is connected through appropriate electrical equipment to the battery for the charging thereof.

The frequency is preferably much higher than the ordinary power line frequency for advantageous coupling, and high charge rates are above 10 kilowatts. The result is that the amount of heat dissipated from the transformer coils, magnetic coils and other electronics contained within the inductively coupled connector transformer container can exceed 50 watts. If the primary inductive charge coupler is not cooled, it can become uncomfortably hot. When withdrawn, this hot inductive charge coupler may cause personal discomfort or injury. It is desirable to keep the temperature level of the inductive charge coupler within tolerable, comfortable limits. In addition, it is desirable to cool the entire transformer so that its internal temperatures do not exceed the operating range of the materials used in the connector housing.

Cooling could be achieved in the automobile, but it is desirable to limit the total automobile weight as much as possible. It is, thus, desirable to improve the cooling methods for the inductively coupled charging connection. It is also useful to employ offboard cooling sources to efficiently cool the transformer primary coil and magnetic core in the inductive charge coupler. This offboard cooling reduces the entire primary transformer structure and reduces the surface temperature of the removable inductive charge coupler.

SUMMARY OF THE INVENTION

In order to aid in the understanding of this invention, it can be stated in essentially summary form that it is directed to an inductive charge coupler in the form of a manually positionable coupler which includes a primary transformer coil and magnetic material for insertion into the inductive charge receptacle which includes a transformer secondary and the balance of the magnetic circuit, together with cooling structure for cooling the inductive charge coupler to extract lost heat therefrom to maintain the inductive charge coupler temperature sufficiently low so that it is not dangerous.

It is, thus, a purpose and advantage of this invention to provide a system for automobile battery charging which includes a transformer having a separable and cooled primary so that the primary may be energized from a stationary source and inserted into the transformer inductive charge receptacle to energize the magnetic circuit therein and the electrical secondary circuit therein.

It is another purpose and advantage of this invention to provide an automobile battery charging system which includes a transformer having a portion thereof separable from the automobile with the separable portion being cooled from sources away from the automobile so that the separable portion remains at a reasonably low temperature for operational purposes and to prevent harm when separation is made.

It is another purpose and advantage of this invention to provide a transformer which is separable, with a portion mounted on a vehicle for the charging of the batteries on the vehicle and the other portion being separable and powered from an off-vehicle source. Cooling of the separable portion provided by this invention results in improved electrical performance and reduced surface temperature of the separable portion. The surface temperature of the separable portion is sufficiently low that it may be manually handled immediately after use.

It is a further purpose and advantage of this invention to provide a separable automobile battery charging transformer, a portion of which remains on the automobile and a portion of which is separable therefrom so as to be permanently connected to a power supply. The separable portion is provided with cooling, which also acts to cool the portion permanently installed in the automobile.

Other purposes and advantages of this invention will become apparent from a study of the following portion of the specification, the claims and the attached drawings wherein:

DESCRIPTION OF THE PREFERRED EMBODIMENTS

Automobile 10 is an automotive vehicle configured for the transportation of a few people and a small amount of baggage. It carries batteries which power motors which are connected to the road wheels. Suitable electrical and mechanical controls are provided to control the speed and direction of the vehicle. The onboard battery must be recharged periodically. In the system in accordance with this invention, charging power comes from a fixed power source 12 which is located adjacent the position where the automobile 10 will be parked. In the present illustration, the automobile 10 is parked on its driveway 14 near the home of the owner of the automobile. A fixed power source 12 may also be located adjacent the parking position of the automobile when the owner is working or shopping.

Figure 1:
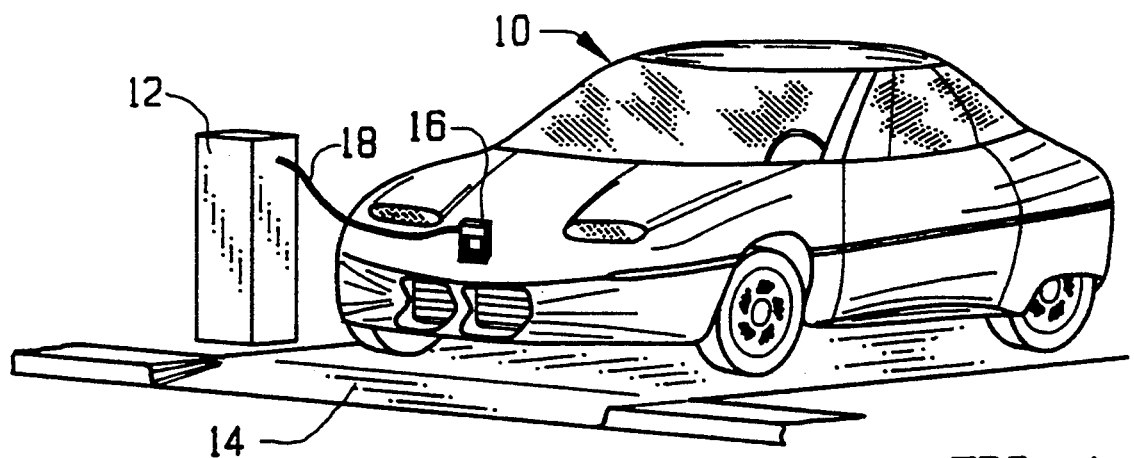
FIG. 1 is a perspective view of an electrically powered automobile which is connected to a stationary battery charging source.
Figure 2:
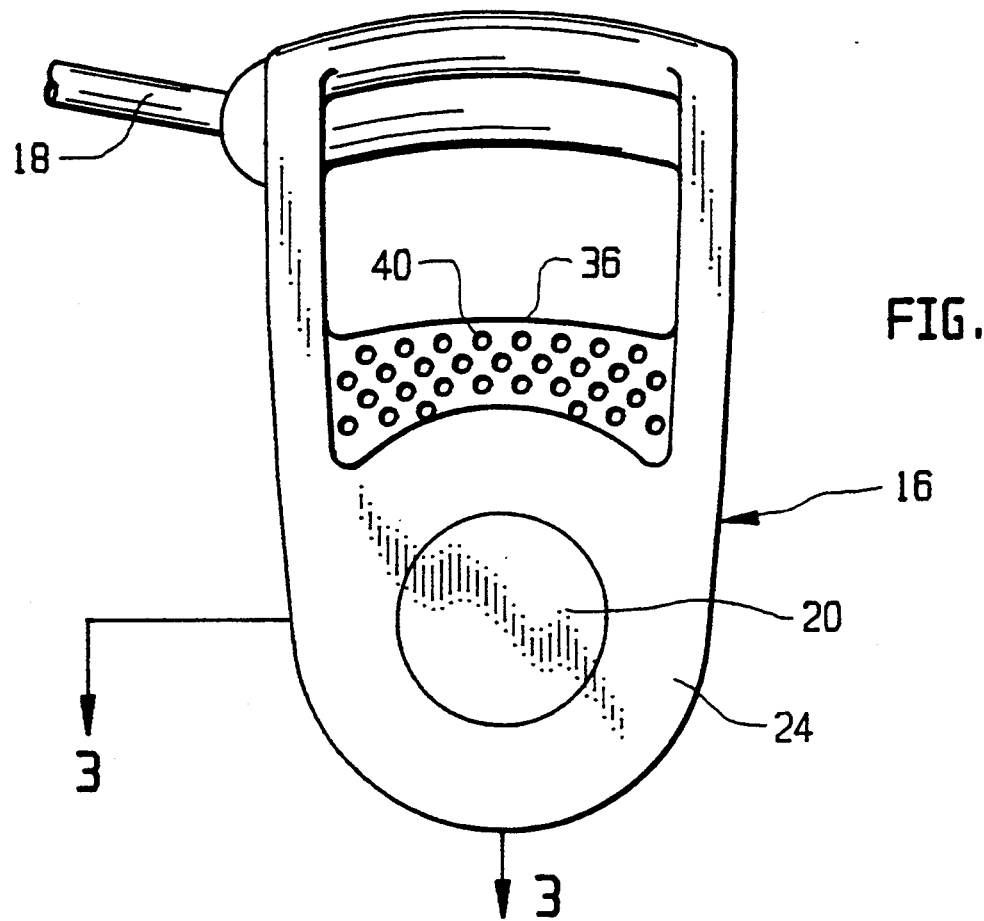
FIG. 2 is an enlarged plan view of the inductive charge coupler which carries transformer windings, a portion of the magnetic circuit material, and which is cooled so as to maintain the inductive charge coupler at a sufficiently low temperature.
Figure 3:
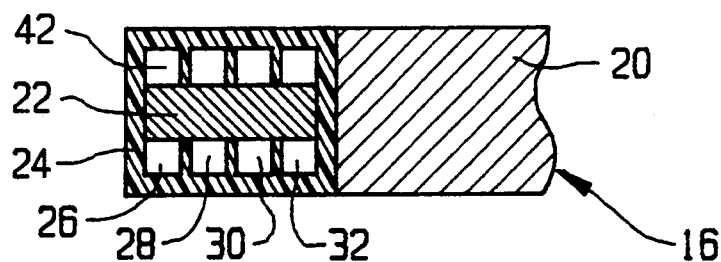
FIG. 3 is an enlarged section taken generally along the line 3—3 of FIG. 2, showing the relationship of the primary transformer winding and cooling fluid paths adjacent thereto.
Figure 4:
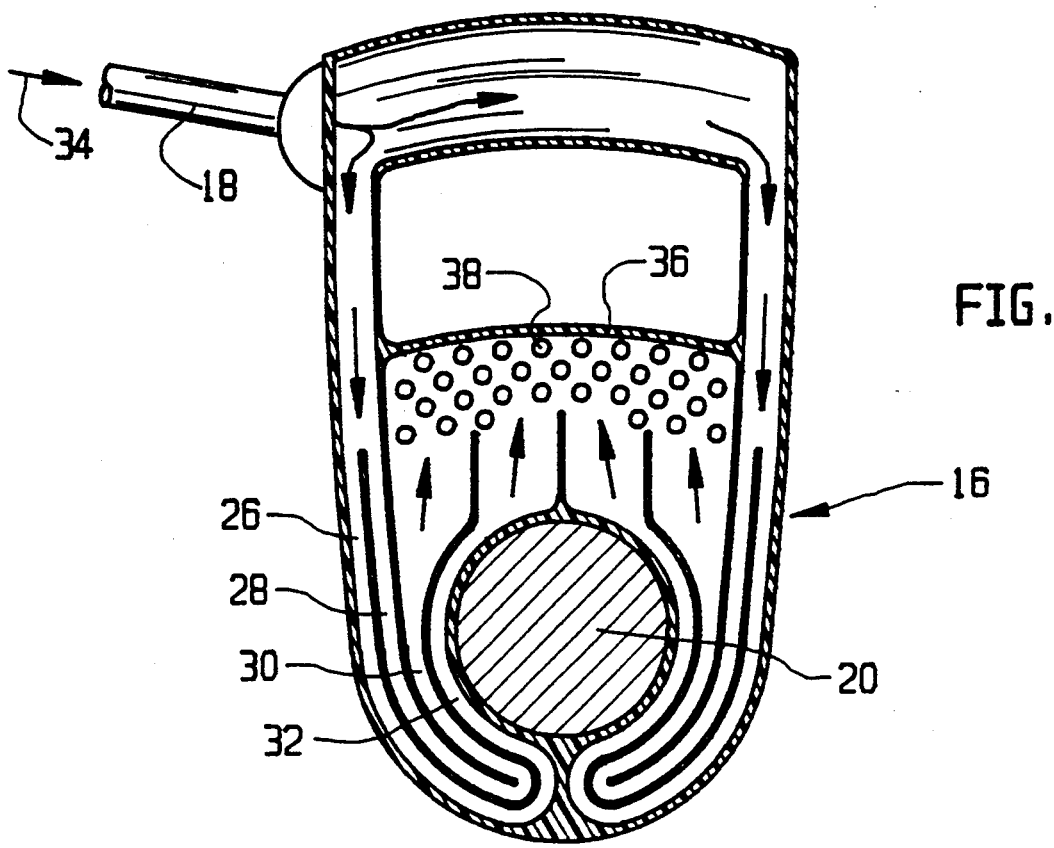
FIG. 4 is a mid-line section through the inductive charge coupler shown in FIG. 2 on a plane parallel to the sheet, showing fluid flow paths through the inductive charge coupler.

It is presupposed by this invention that the automobile will not be directly powered from the power source 12 by means of a direct plug-in, but the charging connection will be inductive. A transformer primary coil is designed to receive power from the power source 12 and to deliver the power through magnetic coupling to a transformer secondary coil in the automobile. The secondary coil is appropriately connected to charge the automobile batteries. The power supply frequency is chosen in connection with the overall power supply parameters, including the transformer parameters. Inductive charge coupler 16, seen plugged into the inductive charge receptacle of the automobile 10 in FIG. 1 and seen in enlarged elevational view in FIG. 2, is connected to the fixed power source by means of cable 18. The cable 18 incorporates the electrical connections. As seen in FIGS. 2 and 4, the inductive charge coupler 16 includes core 20, which is magnetically permeable and which is part of the magnetic circuit of the transformer. The balance of the magnetic circuit is in the automobile in association with the inductive charge receptacle transformer secondary windings. As seen in FIG. 3, primary winding 22 surrounds the core 20 in a dielectric housing 24. When the near portion of FIG. 2 is removed, including removal of the primary winding 22, cooling fluid passages 26, 28, 30 and 32 are seen.

The cooling fluid may be a liquid or a gas, but in the present example, is a cool dry gas such as air. Cable 18 is a cooling air tube as well as electrical cable. Air source 34 within fixed power source 12 also delivers cooling air to the inductive charge coupler. As seen in FIG. 4, the air flows through the cooling fluid passages 26 through 32 and the companion passages on the other side of the inductive charge coupler. The entire cover of the inductive charge coupler is hollow to permit this well-distributed air flow. The cooling air flow goes almost entirely around the core, but returns to panel 36, which is just below the handle opening. The inductive charge coupler is configured to enter into a slot in the automobile, as seen in FIG. 1, and when positioned in its coupling position, the panel 36 is exposed. Outlet holes 38 are seen in FIG. 4 on the far side of the inductive charge coupler, and outlet holes 40 are seen in FIG. 2 on the near side of the inductive charge coupler. After the cooling fluid (in this case, air) goes through its cooling fluid passages, it is discharged to the atmosphere out through openings in the inductive charge coupler.

The temperature of the primary coil will be reduced by 50 to 100 degrees Celsius depending on the type and temperature of the cooling fluid. Cooling the primary will reduce the surface temperature of both the primary and secondary coils during the transfer of power to permit an increase in transmitted power without exceeding the temperature limits of some of the transformer components.

The routing of the coolant gas exhaust from the outlet holes on the inductive charge coupler to a position adjacent the transformer secondary structure creates a low temperature zone adjacent the transformer secondary structure at the inlet slot of the inductive charge receptacle into which the inductive charge coupler is inserted. This low temperature zone directly adjacent the transformer secondary structure, both the magnetic circuit and secondary electrical circuit, aids in reducing the temperature of the structure installed on the automobile.

Figure 5:
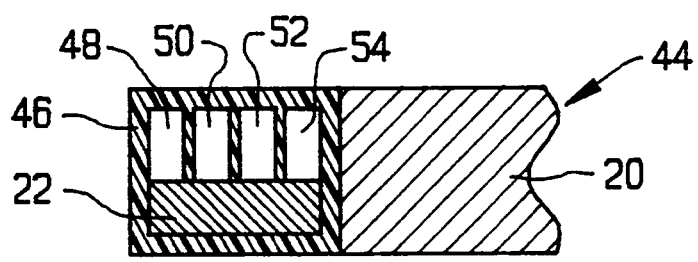
FIG. 5 is a section similar to FIG. 3, but showing a different relationship of the primary windings to the cooling fluid flow paths.

In the embodiment of FIG. 3, the cooling fluid passages are positioned on both sides of the primary winding 22. A set 42 of cooling fluid passages exactly the same as cooling fluid passages 26 through 32 is positioned on the opposite side of the primary winding 22. This is not necessarily the only positioning of the cooling fluid passages with respect to the primary winding. In the inductive charge coupler 44, shown in FIG. 5, the inductive charge coupler has the same primary 22 and the same dielectric core 20, but the winding is located on one side of the dielectric housing 46. The dielectric housing 46 is for cooling fluid passages 48, 50, 52 and 54, as the passages previously described in FIG. 2, but these passages in FIG. 5 are completely on one side of the primary 22.

Figure 6:
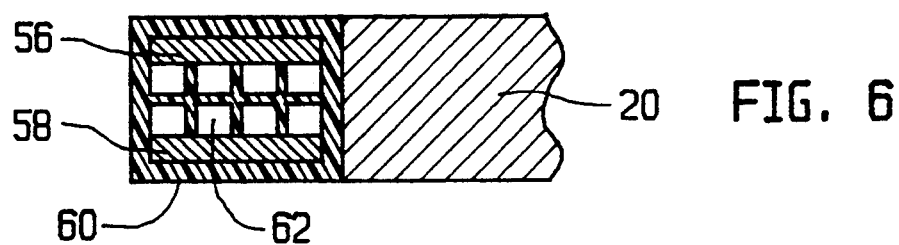
FIG. 6 is a view similar to FIG. 3 showing yet another end relationship between the primary windings and the coolant fluid flow paths.

In FIG. 6, the primary coil of the coupling transformer is divided into two primary halves 56 and 58, with cooling passages therebetween. The primary halves are housed in dielectric housing 60, which surrounds core 20 and which divides the space between the primary halves into cooling fluid passages. In this case, there are eight cooling fluid passages 62 which correspond in shape to the cooling fluid passages 26 through 32. In this way, cooling is provided between the transformer primary halves.

Figure 7:
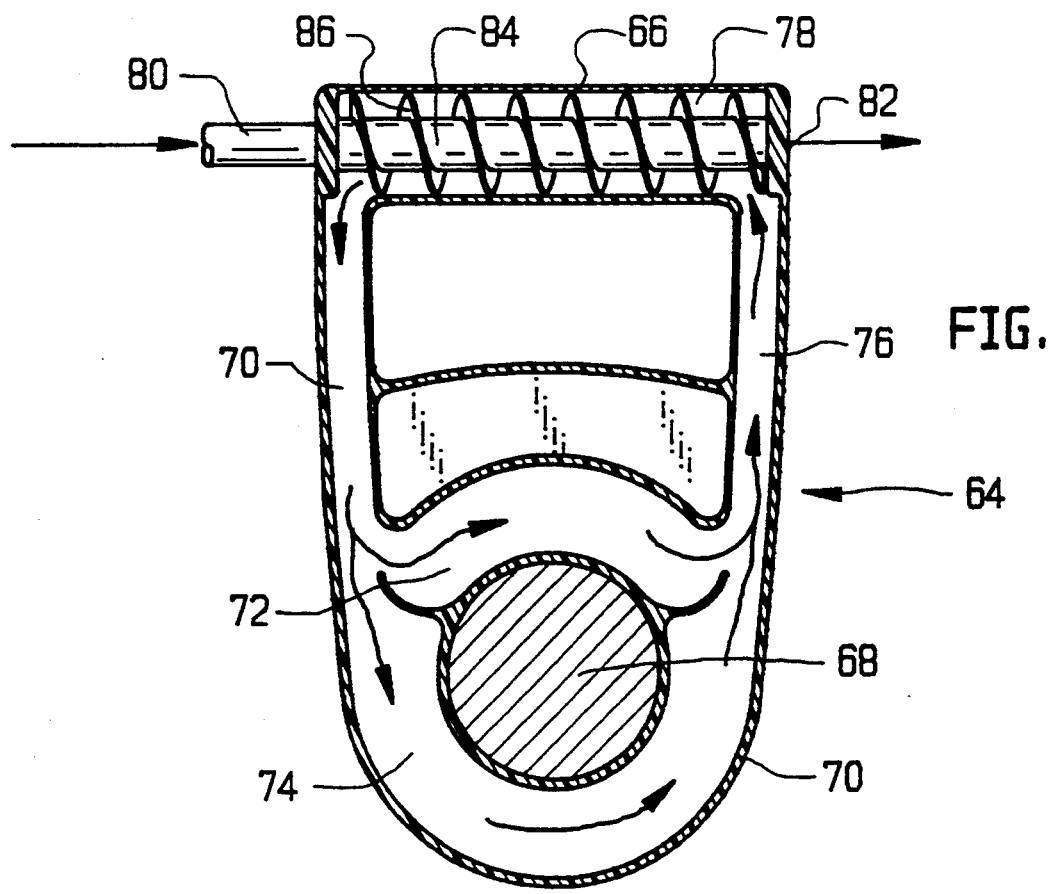
FIG. 7 is a view similar to FIG. 4 showing a different arrangement of fluid flow.
Figure 8:
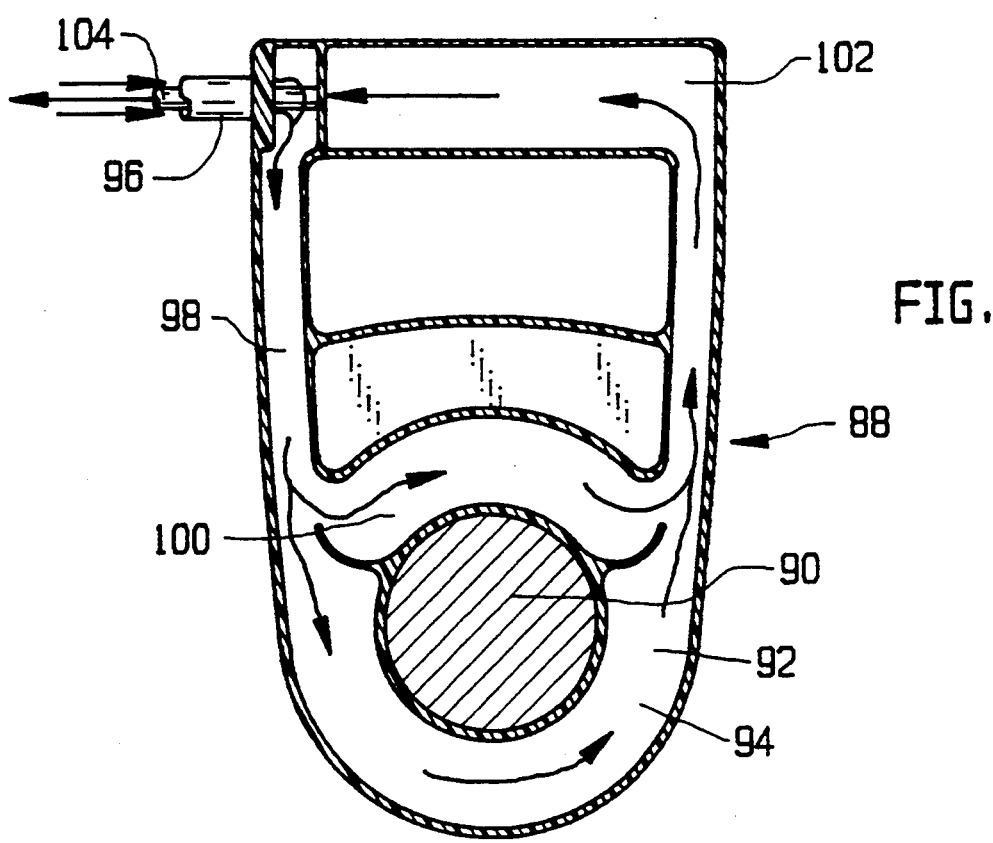
FIG. 8 is similar to FIG. 4 showing yet another arrangement of the fluid flow structure.

FIG. 4 illustrates the use of a cooling fluid such as air, which can be exhausted to atmosphere. The cooling fluid passages in FIGS. 7 and 8 can be the same as those illustrated in FIG. 4, except for reconfiguration to prevent exhaust. In FIGS. 7 and 8, the cooling fluid is returned. Inductive charge coupler 64 has handle 66 for manual insertion of the inductive charge coupler into the slot in the automobile. Inductive charge coupler 64 has a core 68 within a dielectric housing 70. The dielectric housing has cooling fluid passages therein to permit the circulation of cooling fluid. In FIG. 7, inlet 70 divides into cooling passages 72 and 74, which extend around core 68 and join in outlet passage 76. The outlet passage 76 and inlet passage 70 are connected through pump passage 78. Thus, the coolant passages are continuous and self-contained. There is no inlet or outlet structure. In order to provide proper cooling, there is need to cool and move the coolant in this continuous coolant passage. This coolant is preferably a dielectric, non-magnetic liquid with high specific heat and high thermal transmissivity.

Within the handle 66, there is a structure which acts both as a coolant pump and a coolant cooler. Pressurized secondary coolant is provided at secondary coolant inlet 80. The secondary coolant is such that it can be freely discharged to the air from secondary coolant outlet 82. Cool air is a suitable secondary coolant. Pump structure 84 has an internal vane structure through which the secondary coolant passes and rotates the pump structure 84. The rotational motion of the pump structure causes its vanes 86 to pump the primary coolant in the direction of the arrows. The pump structure 84 has the cool secondary coolant on the inside and has the primary coolant on the outside within the handle. Heat exchange also takes place, additionally with the aid of the vanes 86 which act both as a pumping device and as an extended thermal transformer surface. By means of the inductive charge coupler 64, we achieve closed-circuit cooling by a preferred primary circulating coolant while a secondary coolant stream provides the pumping power and the heat transfer out of the primary coolant.

The use of a gas-powered pump in the handle of the inductive charge coupler to pump coolant liquid in the inductive charge coupler combines the advantages of gas as the prime mover and liquid fluid as the heat exchange fluid. This system reduces the weight of the pump assembly permitting it to be located in the handle of the inductive charge coupler.

Inductive charge coupler 88, shown in FIG. 8, is again of the physical structure of inductive charge coupler 16 and is electrically connected in the same way so that it can act as a primary transformer coil and as a part of the magnetic circuit of the coupling transformer. The magnetic core 90 is surrounded by a primary magnetic coil 92 which is beyond the cooling fluid passage 94, as seen in FIG. 8. In this case, the coolant fluid is supplied by a coolant inlet tube 96. The inlet tube is connected to an internal coolant passage in the inductive charge coupler which includes inlet passage 98 which divides into passages 94 and 100, which separate and pass around the core and against the wall of the primary coil. Outlet passage 102 receives the coolant flow from passages 94 and 100, which moves up the right side of the inductive charge coupler and through the handle to outlet tube 104. The outlet tube returns the coolant fluid to the source of coolant. In this case, the coolant is returned to its source and, thus, need not be a coolant which can be discharged freely. For example, the coolant may be a chlorinated or fluorinated hydrocarbon or may be a liquid coolant such as water, ethylene glycol or water solutions thereof. It is important to note that each of the three inductive charge coupler cooling systems of inductive charge couplers 16, 64 and 88 can be used with any of the three interfaces between the coolant and the primary winding, as represented in FIGS. 3, 5 and 6. In this way, the primary of the automobile battery charging transformer is cooled. This cooling maintains the inductive charge coupler temperature sufficiently low so that, when battery charging is terminated and the inductive charge coupler is withdrawn, the inductive charge coupler has a surface temperature sufficiently low so that, if it is touched, it does not harm the user. The cooling of the primary inductive charge coupler, in this way, also achieves cooling of the transformer as a whole to permit higher power transfer in the transformer.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An electrical transformer comprising:
an inductive charge coupler for insertion into a slot in a transformer secondary inductive charge receptacle including secondary electrical windings and magnetically conductive material forming a portion of a magnetic circuit, said inductive charge coupler having magnetic material thereon for completing the magnetic circuit when said inductive charge coupler is inserted into said slot in the secondary inductive charge receptacle, said inductive charge coupler having a primary electrical winding thereon so that when said inductive charge coupler is in the slot in the secondary inductive charge receptacle, energization of said primary winding causes energization of said secondary electrical windings, said inductive charge coupler being removable from said slot in said inductive charge receptacle, said inductive charge coupler and said secondary electrical windings being separable; and
a cooling fluid circuit in said inductive charge coupler for cooling said primary winding in said inductive charge coupler and for cooling said inductive charger coupler.

2. The electrical transformer of claim 1 wherein said inductive charge coupler has a handle and said cooling fluid circuit extends into said handle.

3. The electrical transformer of claim 1 wherein said magnetic material in said inductive charge coupler is within said primary electrical winding and said cooling circuit comprises a coolant fluid passage which extends substantially around said magnetic material and lies adjacent said primary winding.

4. The electrical transformer of claim 3 wherein said coolant fluid passage extends through said handle.

5. The electrical transformer of claim 3 wherein said coolant fluid passage lies on one side of said primary winding.

6. The electrical transformer of claim 3 wherein said coolant fluid passage comprises a plurality of coolant fluid passages around said magnetic material.

7. The electrical transformer of claim 3 wherein said coolant fluid passage lies on both sides of said primary electrical winding.

8. The electrical transformer of claim 3 wherein said primary electrical winding is separated into two primary electrical windings portions and said coolant fluid passage lies therebetween.

9. The electrical transformer of claim 3 wherein said coolant fluid is a gas and said gas is discharged to atmosphere after it is passed through said coolant fluid passage.

10. The electrical transformer of claim 3 wherein said coolant fluid passage is a closed passage and coolant fluid is circulated therein.

11. The electrical transformer of claim 10 wherein there is a pump in said closed passage for circulating said coolant fluid through said closed passage.

12. The electrical transformer of claim 11 wherein said pump is actuated by a gas-driven motor and there is a connection to said gas-driven motor for the supply of pressurized gas thereto for driving said motor, said pressurized gas being in heat exchange relationship to coolant fluid in said closed passage to cool said coolant fluid.

13. The electrical transformer of claim 1 wherein a supply tube is connected to said inductive charge coupler and coolant is delivered to said inductive charge coupler through said supply tube.

14. The electrical transformer of claim 1 wherein a return tube is connected to said inductive charge coupler and coolant is returned through said return tube.

15. An automotive vehicle having a slot therein and having electric transformer secondary structure adjacent said slot, including a secondary electrical winding and a magnetic core forming a portion of a magnetic circuit;
    an inductive charge coupler for insertion into said slot, said inductive charge coupler having a primary electrical winding and primary magnetic core for completing the magnetic circuit when said inductive charge coupler is in said slot, said inductive charge coupler being connected to a fixed power source for energization of said primary magnetic core so that electric power is transferred to said vehicle; and
    cooling means on said inductive charge coupler for cooling said inductive charge coupler.

16. The automotive vehicle of claim 15 wherein said cooling means comprises a coolant fluid passage in said inductive charge coupler for controlling flow of coolant fluid through said inductive charge coupler to cool said primary electrical winding in said inductive charge coupler and said magnetic core in said inductive charge coupler.

17. The automotive vehicle of claim 16 wherein said coolant fluid passage passes on one side of said primary electrical winding.

18. The automotive vehicle of claim 16 wherein said coolant fluid passage is on both sides of said primary electrical winding.

19. The automotive vehicle of claim 16 wherein said primary electrical winding in said inductive charge coupler is separated into two portions and said fluid passage is positioned between said two portions of said primary electrical winding.

20. The automotive vehicle of claim 16 wherein said inductive charge coupler is connected to said fixed power source by means of a flexible cable and said coolant fluid is delivered through said flexible cable to said inductive charge coupler to pass through said passage in said inductive charge coupler.

21. The automotive vehicle of claim 16 wherein said fluid is a gas and said fluid is exhausted into atmosphere.

22. The automotive vehicle of claim 21 wherein said gas is exhausted adjacent said transformer secondary structure.

23. The electric transformer of claim 16 wherein a supply tube is connected to said inductive charge coupler and the coolant is delivered to said inductive charge coupler through said supply tube.

24. The electric transformer of claim 15 wherein a return table is connected to said inductive charge coupler and the coolant is returned through said return tube.

25. The electric transformer of claim 23 wherein a return tube is connected to said inductive charge coupler and the coolant is returned through said return tube.

26. The automotive vehicle of claim 21 wherein there is a motor in said inductive charge coupler and said coolant fluid is exhausted through said motor to actuate said motor and there is a pump in said inductive charge coupler, said pump being actuated by said motor and there is coolant liquid in said coolant passages in said inductive charge coupler, said coolant liquid being circulated by said pump and being cooled by said coolant fluid actuating said motor.

27. The automotive vehicle of claim 21 wherein said coolant fluid is a liquid and is returned through said cable.

28. An electrically powered vehicle having wheels for the support and transport thereof and for being powered by a battery and a motor thereon connected to said wheels, an electronic transformer secondary structure on said vehicle, said electronic transformer secondary structure including a secondary electrical winding and a secondary magnetic core;
    an inductive charge coupler comprising a primary electrical winding and a primary magnetic core so that when said coupler is positioned adjacent said secondary structure, said primary and secondary magnetic cores complete a magnetic circuit;
    a fixed power source, said inductive charge coupler being connected to said fixed power source so that energization of said primary core by said fixed power source induces current in said secondary electrical winding to transfer electric power to said vehicle; and
    cooling means on said inductive charge coupler for cooling said inductive charge coupler, said cooling means including coolant fluid passages in said inductive charge coupler and a coolant fluid tube connected to said inductive charge coupler to transfer coolant fluid thereto.

29. The electrically powered vehicle of claim 28 wherein said coolant tube is connected to said inductive charge coupler and to a fixed source of said coolant fluid.

30. The electrically powered vehicle of claim 29 further including a return tube connected to said inductive charge coupler and to said coolant fluid source to return said coolant fluid from said inductive charge coupler to said fixed source of said coolant fluid.

31. The electrically powered vehicle of claim 30 wherein said fixed source of said coolant fluid is positioned with said fixed power source.

* * * * *